United States Patent [19]

Lim et al.

[11] Patent Number: 6,151,224
[45] Date of Patent: *Nov. 21, 2000

[54] POWER SUPPLY WITH REDUCED POWER COMSUMPTION IN STANDBY MODE

[75] Inventors: Siew Mui Lim, Singapore, Singapore; Yoon Choy Lim, Kulai, Malaysia

[73] Assignee: Thomson Licensing, S.A., Boulogne Cedex, France

[ * ] Notice: This patent issued on a continued prosecution application filed under 37 CFR 1.53(d), and is subject to the twenty year patent term provisions of 35 U.S.C. 154(a)(2).

[21] Appl. No.: 09/191,656

[22] Filed: Nov. 13, 1998

[30] Foreign Application Priority Data

Nov. 17, 1997 [EP] European Pat. Off. .............. 97203583

[51] Int. Cl.[7] .................................................. H02M 3/335
[52] U.S. Cl. .............................................. 363/21; 363/70
[58] Field of Search ............................... 363/69, 70, 21; 307/17

[56] References Cited

U.S. PATENT DOCUMENTS 4,672,516   6/1987   Ney et al. ................................. 363/16
5,126,930   6/1992   Ahn ............................................ 363/21

FOREIGN PATENT DOCUMENTS 3518676A     5/1985   Germany .
19545659A    6/1997   Germany .

OTHER PUBLICATIONS

R. Newman, "Servicing the Philips G110 Chassis", Television, Dec. 1995, pp. 106–110.

Primary Examiner—Shawn Riley
Attorney, Agent, or Firm—Joseph S. Tripoli; Joseph J. Laks; Daniel E. Sragow

[57] ABSTRACT

A switched mode power supply comprises a circuit which, during a stand by mode, reduces the voltage output of the power supply to a minimum necessary to supply a microprocessor of an electronic appliance in which the supply is included. The circuit is included in a feedback loop from a power supply output to control a switching transistor. The effect of circuit is to reduce the ON time of said transistor, leading to a reduction of the output energy of the power supply.

9 Claims, 2 Drawing Sheets

POWER SUPPLY WITH REDUCED POWER COMSUMPTION IN STANDBY MODE

FIELD OF THE INVENTION

The invention relates to a switched mode power supply having a stand by mode, during which the electric power consumption is reduced.

BACKGROUND OF THE INVENTION

In a switched mode power supply, such for instance as the one represented in FIG. 1, a direct current source 1 is applied to the main path of a switching means, for instance a Field Effect Transistor 14 (FET). When switching MOSFET is ON a current is flooding from direct current source 1 through a primary winding 3 of a flyback transformer 2 and across a drain 37 to a source 38 of said transistor 14 and across a resistor 28 to primary ground. In a known way the resulting pulsed current applied to primary winding 3 of forward or flyback transformer 2 is producing a pulsed current at the secondary 40 of transformer 2. After rectification by rectifiers 4, 5, 6, 7 and smoothing by filter circuits such as circuit 8, voltage of different values coming from secondary windings 9, 10, 11, and from taps 12, 13, of those secondary windings are applied to loads not represented of an electronic appliance, for instance a video tape recorder (VCR) or a television set (TV) or others. The ratio of the ON time of the FET 14 relative to the total switching period of the FET 14 is controlled by a feedback loop 15. The feedback loop 15 is taken from one or a combination of the voltages at the output of a smoothed and rectified secondary of the transformer 2. The power supply has different modes of working. As examples it will be cited there after a normal mode and a stand by mode. The normal mode is a mode in which the appliance being ON, the power supply delivers the average power which is needed for the appliance to work properly. In the stand by mode the appliance is OFF, but a part of it is still powered. In electronic appliances such as TV and VCR it is the receiver for a remote control of the appliance. Said remote control receiver must be able first to reset a microprocessor for control of the appliance, said microprocessor when reset having a software to progressively revive the power supply up to the point where it will be delivering a sufficient power for the functions of the appliance that have been revived. In general said microprocessor must be fed with a 5 volts minimum voltage to be able of being reset. In general also the voltage at the output of the power supply delivering what is called the 5 volts supply is greater than 5 volts for instance 5.3 volts so that with the voltages drops along the copper lines and switches the voltages at the inputs of circuits needing a minimum 5 volts voltage is still above 5 volts.

SUMMARY OF THE INVENTION

The purpose of the invention is to lower the power consumption in stand by mode. The output power is the products of output currents and output voltages. Reduction of either current or voltage on the output lines of the secondary windings delivering the needed voltages for instance 5V, 14V, 33V, 27V . . . etc. will be able to cut down the output power, hence reducing the input power. The voltage which is required at the output of a secondary winding of transformer 2, is equal to the minimum voltage which is required at the input of a circuit fed by said voltage, increased with the maximum drops of voltage that may occur between said output and said input. If there are several circuits that are to be fed from the same output of the transformer, then the minimum voltage to be set at said output, is the bigger value of the different minimum values needed for each of the circuit. It may happen, and it is often the case, that a circuit which is needed to be fed in normal mode need not be fed in stand by mode. If it is the case, and if the minimum output voltage which is needed for said not needed in stand by mode circuit leads to a voltage which is higher than all the ones which are needed in stand by mode, then in stand by mode there is a margin to reduce said voltage, and then to reduce consumption in this mode. Of course in such a case and to take advantage of this margin, the power supply must be fitted with a circuit that will enable the power supply to deliver on at least one of its outputs a lower voltage during stand by mode than during normal run mode.

To sum up the invention is about a switched mode power supply of an electronic appliance the appliance having different circuits that may or may not be powered according to a mode of control of the appliance, the power supply being capable of at least two modes, a first one being a stand by mode in which only some of the circuit are powered and a second being a normal mode in which the circuits of the appliance are fed in accordance with a normal working of the appliance, the power supply being fitted with a transformer having primary and secondary windings, the primary windings of the transformer being connectable to a direct current source, switching active electronic means having a drive electrode fitted with polarisation means, the switching means causing when they are switched ON, a current to flow through the primary windings of the transformer, the secondary windings of the transformer being coupled to rectifying and smoothing means to deliver output voltages that are needed for the different circuits of the appliance, one at least of the delivered voltages being to feed at least 2 different circuits, a first and a second, the first one being powered in normal mode and not powered in stand by mode, said first one requiring the output voltage to be settled at a higher voltage than the second circuit, said second circuit being powered in the normal and in the stand-by mode, power supply wherein a time ON shortening circuit is coupled to the polarisation means of the driving electrode of the switching means whose function is to bring back said one at least output voltage from a higher value in normal mode to a lower value in stand by mode, said lower value being the one which is needed to supply the second circuit.

Said in a different way, not pointing out what the interest of the invention is, the invention is about a switched mode power supply of an electronic appliance, the power supply being capable of at least two working modes, a stand by mode and a normal mode, the power supply being fitted with a transformer having primary and secondary windings, the primary windings of the transformer being connectable to a direct current source, switching active electronic means having a drive electrode fitted with polarisation means, the switching means causing when they are switched ON, a current to flow through the primary windings of the transformer, the secondary windings of the transformer being coupled to rectifying and smoothing means to deliver output voltages that are needed for different circuits of the appliance, power supply wherein a time ON shortening circuit is coupled to the polarisation means of the driving electrode of the switching means whose function is to shorten time ON of said switching means then settling one output voltage from a higher value in normal mode to a lower value in stand by mode.

The action of the time ON shortening circuit is to shorten the time ON of the switching transistor. So, although the lowering of the output voltages is settled to a minimum value which is needed for instance for the microprocessor, that is to say one of the circuits, the fact that said lowering of said voltage is got by shortening time ON, of the switching means, will have a lowering effect on all the output voltages. That will contribute to the lowering of the electrical consumption of electrical power in stand by mode.

In the preferred embodiment of the invention the time ON shortening circuit has an input coupled to one of the terminals delivering an output voltage, and an input coupled to the drive electrode. That means that the time ON shortening circuit is in a feedback loop of the power supply.

BRIEF DESCRIPTION OF THE DRAWINGS

An embodiment of the invention will now be described in accordance with the appended drawings in which.

Figure 1:
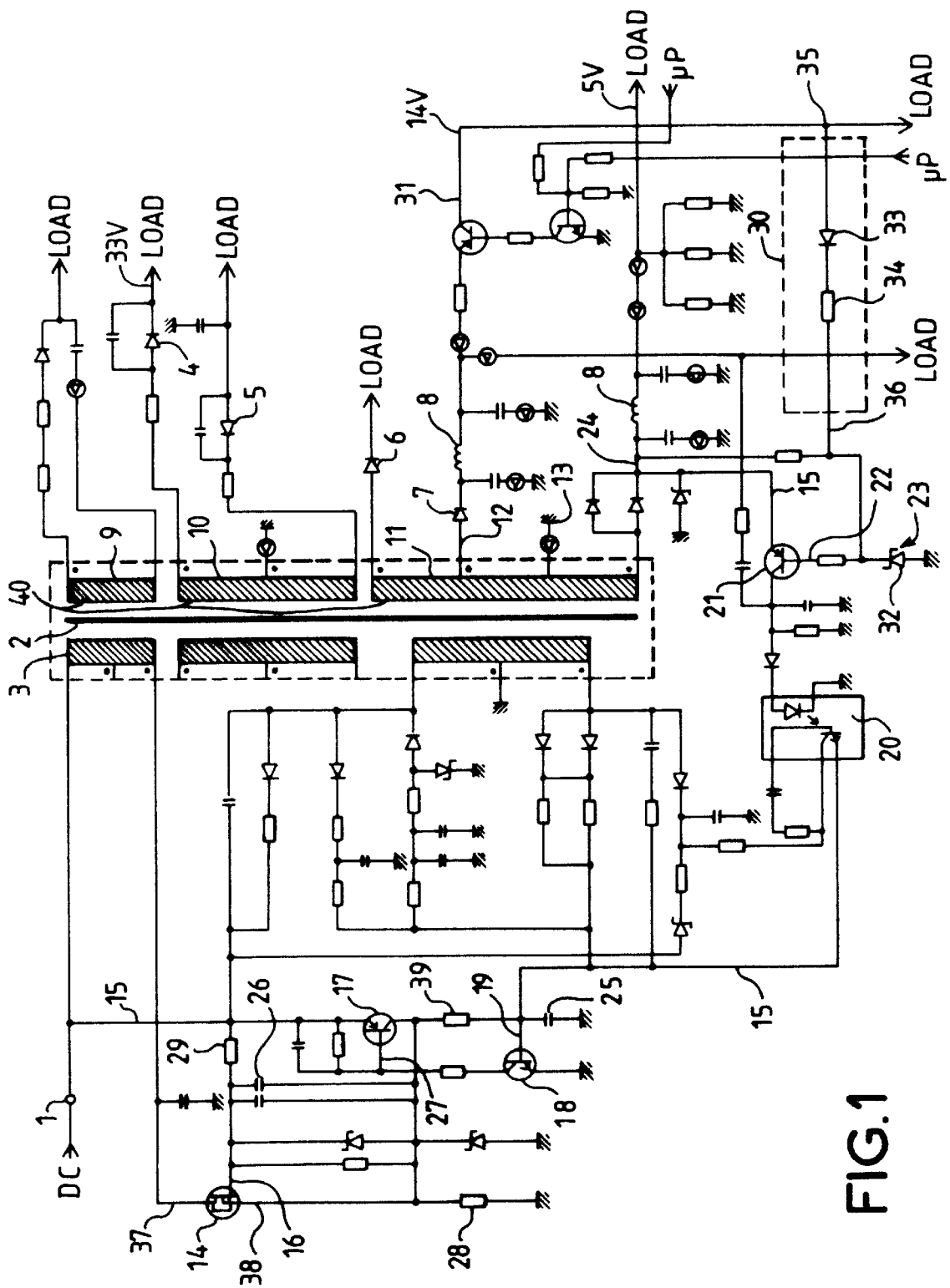
FIG. 1 which has already been partially commented is a circuit diagram of a power supply according to the invention.

Coming back to FIG. 1, it has already been explained that power transmitted from the primary of transformer 2 to secondary 40 of said transformer is depending upon time ON of switching transistor 14. The duration of ON time is depending upon the value of a voltage at the gate 16 of MOSFET 14, said voltage being in direct relation with voltage at the ends of capacitors 26, whose charging circuit is under control of transistors 17 and 18. The base 19 of transistor 18 is under control of a photo coupler 20 that bring back with galvanic insulation a feedback current from the secondary side. Primary side and secondary side of the transformer are often referred to as hot and cold side of the power supply. On the cold side photo coupler 20 is fed through a transistor 21. Capacitor 26, transistor 17, 18, photo coupler 20 and transistor 21 are the main components of a feedback loop 15.

Figure 2:
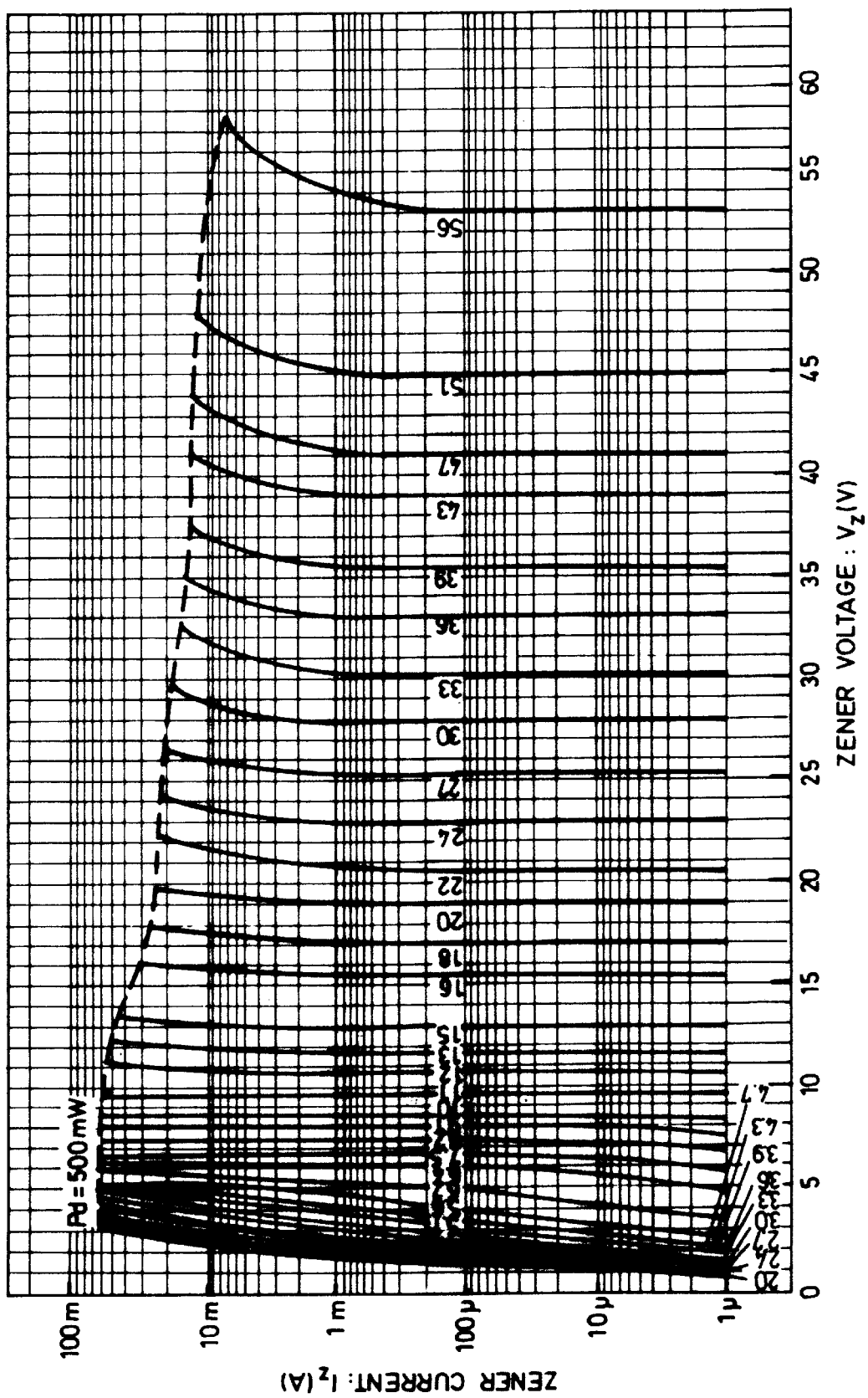
FIG. 2 is a set of characteristic curves of a zener diode which is used to explain how the invention is working.

The working of said feedback loop will now be explained. Transistor 21 has its base 22, polarised by mean of a zener diode 23. The polarising voltage of base 22 is depending upon the value of a current going from a terminal 24 of a secondary winding of transformer 2. If for any reason there is for instance, a lower current is flooding from terminal 24 through zener diode 23, the drop of voltage due to zener diode 23 is reduced. See the characteristic of zener diode 23 in FIG. 2. That means that polarising voltage at the base 22 of transistor 21 is reduced. In the case represented in FIG. 1 transistor 21 is a PNP small signal transistor. With a smaller base voltage it will be allowed to be turn ON for a longer time and this will allow more collector current to flow through transistor 21. That means that more current is directed toward the cold side of photo coupler 20. More current in cold side of photo coupler 20 means also more current at the hot side. Said current of the hot side is added to current coming from drain 37 to source 38 of transistor 14 and to a resistor 39 to polarise at a higher level the base 19 of a transistor 18. Then the polarisation of transistor 18 is settled to a higher level. That allows transistor 18 which in this case is a NPN transistor to be ON for a longer time. The collector emitter path of transistor 18 is connected to the base 27 of transistor 17. So in turn transistor 17 will be ON a longer time. The collector emitter path of transistor 18 is bypassing polarising resistor 29 of the gate 16 of switching transistor 14, and then pulling to low said gate 16. The longer said gate 16 is pulled to low the shorter said MOSFET transistor 14 is ON. Then to make a long story short, if a current higher than a predetermined value is detected at a terminal 24 of a winding of the secondary side, a feedback loop 15 is activated and the time ON of MOSFET 14 is reduced. Said feedback loop is controlling the polarisation means, here transistor 17 that bypass polarising resistor of the gate 16 of MOSFET 14. It is to be noted that in a strict sense polarising means of MOSFET 14 is resistor 29. In the case of a transistor which is normally working with a permanent succession of ON and OFF states it may be considered in this application that transistor 17 which is bypassing said resistor 29 in order to reduce voltage at gate 16 under the minimum needed for the transistor to be ON, is also a part of the polarising means. The feedback loop 15 and the way it is working that has been described up to now is a normal and known feedback loop. An example of a circuit which may be added to arrive at a power supply according to the invention will now be described.

The added circuit according to the invention is referred to as 30 on FIG. 1. Circuit 30 is connected between a terminal 31 at a tap 31 of a secondary winding of transformer 2, and the cathode 32 of zener diode 23. Circuit 30 is made of a diode 33 and of a resistor 34 connected in series. The tap 31 at which an input 35 of circuit 30 is connected is in normal operation mode, fed with a voltage which is higher than the voltage at the terminal 24 which is the starting point of feedback loop 15. The output 36 of circuit 30 is as already said connected to cathode 32 of diode 23, said cathode 32 being also coupled via a resistor to terminal 24 of transformer 2. The fact that terminal 31 is in normal mode at a higher voltage than terminal 24 means that in normal mode a current is flooding through diode 33 of circuit 30 toward Zener diode 23. Said current is flooding through said diode 23 and hence according to the characteristic of FIG. 2 said additional current in zener diode means a higher drop of voltage. What has been explained up to now about circuit 30 means that in normal mode the drop of voltage at the base 22 of transistor 21 is due to an addition of two currents in said zener diode one coming from terminal 24 and one coming from terminal 31. As has been explained above, time ON and OFF of switching MOSFET 14 is determined by the polarisation of transistor 21. The adjusting of said polarisation for normal mode must take in account the effect of circuit 30 and of the added current.

Tap 31 has been chosen because in stand by mode, terminal 31 is OFF. No current is going anymore through diode 33 of circuit 30. One of the two currents to settle the drop of voltage at the base 22 of transistor 21 is missing, and then as explained above in relation with the description of prior art working of loop 15, time ON of MOSFET 14 will be reduced leading to a reduced voltage output on every terminal or tap of the secondary windings 40 of transformer 2. In particular 5 volts only generated and just enough to supply the microprocessor. Less energy is being transferred to the secondary 40 of the transformer. In a realisation of a switched mode power supply according to the preferred embodiment the following results have been achieved: Less energy is transferred in stand by mode to the secondary side as a consequence of the following reductions of voltage:

5.3VE level reduced from 5.3V to 5.1V.

14VE level reduced from 14.5V to 12V.

−27VE level reduce from −27V to −22.5V

33VE level reduced from 33V to 26V.

4.2V level reduced from 4.2V to 2.9V.

End result, input power measured, reduced about 1 W or 22% from 4.5 W to 3.5 W during a standby mode that is now called ecological stand by mode.

The embodiment of the invention that has just been described is a very simple and cost effective one. It has the advantage to be fully automatic, and to settle the feedback loop in a new state that will reduce voltage outputs as soon as the stand by mode is settled. However it can be seen that any circuit that would be coupled to the controlling circuit 17 of gate 16 of MOSFET 14, said circuit having two output states a first for normal mode and a second for stand by mode, the second state of circuit 30 triggering ON transistor 17 which is bypassing polarisation resistor 29 of driving electrode 16. In a more general way any circuit coupled to polarising means of a drive electrode and having a first output state in normal mode and a second one in stand by mode said second state reducing time ON of the transistor would be a time ON shortening circuit as circuit 30 of the above embodiment.

What is claimed is:

1. Switched mode power supply of an electronic appliance, the power supply being capable of at least two working modes, a standby mode and a normal mode, the power supply being fitted with a transformer having primary and secondary windings, the primary windings of the transformer being connectable to a direct current source, the secondary windings of the transformer being coupled to rectifying and smoothing means to deliver output voltages on at least one output, wherein a first circuit, which is active in the standby mode and in the normal mode and needing a given voltage value, is connected to the output, wherein a second circuit, which is inactive in the standby mode and active in the normal mode needing a higher voltage value than said given voltage value, is connected to the output, and wherein a circuit allows reduction of the voltage at the output to said given voltage value when in the standby mode.

2. Switched mode power supply according to claim 1, wherein the first circuit includes a microprocessor.

3. Switched mode power supply according to claim 2, wherein switching means having a drive electrode fitted with polarisation means controlled by a feedback loop cause when they are switched ON a current to flow through the primary windings of the transformer.

4. Switched mode power supply according to claim 3, wherein the feedback loop comprises a time ON shortening circuit for shortening the ON-time of the switching means.

5. Switched mode power supply according to claim 4, wherein said time ON shortening circuit generates a current representative of the working mode which is added to a current representative of a voltage at a tap of a secondary winding.

6. Switched mode power supply according to claim 5, wherein said time ON shortening circuit is connected to a terminal of a secondary winding which is different from said output.

7. Switched mode power supply according to claim 6, wherein said terminal is OFF in stand by mode.

8. Switched mode power supply according to claim 7, wherein said time ON shortening circuit comprises a rectifying means connected in series with a resistor.

9. Switched mode power supply of an electronic appliance, the appliance having different circuits that may or may not be powered according to a mode of control of the appliance, the power supply being capable of at least two modes, a first one being a standby mode in which only some of the circuit are powered and a second being a normal mode in which the circuits of the appliance are fed in accordance with a normal working of the appliance, the power supply being fitted with a transformer having primary and secondary windings, the primary windings of the transformer being connectable to a direct current source, switching means having a drive electrode fitted with polarisation means, the switching means causing when they are switched ON, a current to flow through the primary windings of the transformer, the secondary windings of the transformer being coupled to rectifying and smoothing means to deliver at least one output voltage which is to feed at least a first circuit and a second circuit, the first circuit being powered in normal mode and not powered in standby mode, the first circuit requiring the output voltage to be settled at a higher voltage than the second circuit, the second circuit being powered in the normal and in the stand-by mode, wherein a time ON shortening circuit is coupled to the polarisation means of the driving electrode of the switching means so as to reduce the output voltage from a higher value in normal mode to a lower value in standby mode, said lower value being the one which is needed to supply the second circuit.

* * * * *